UNITED STATES PATENT OFFICE.

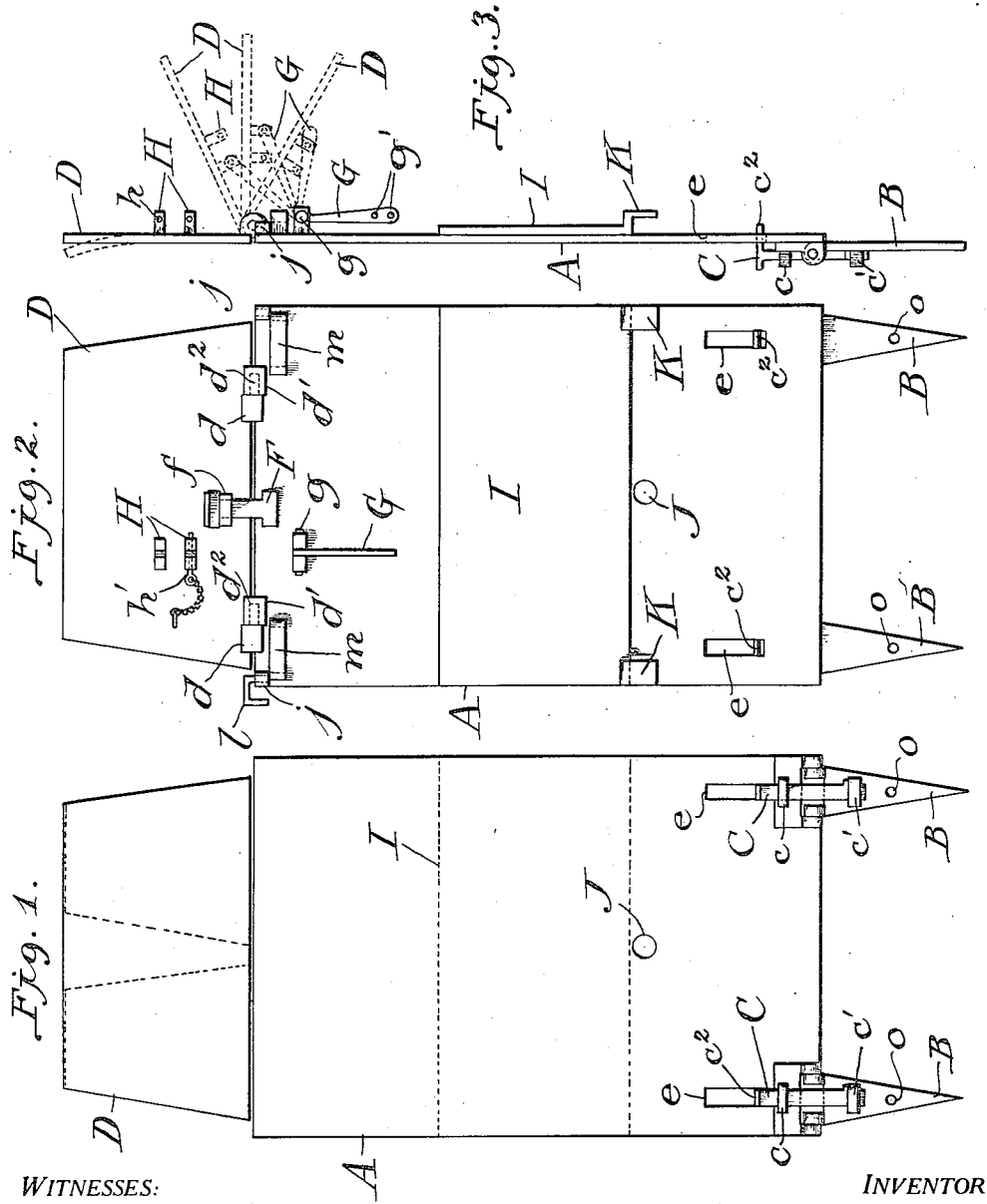

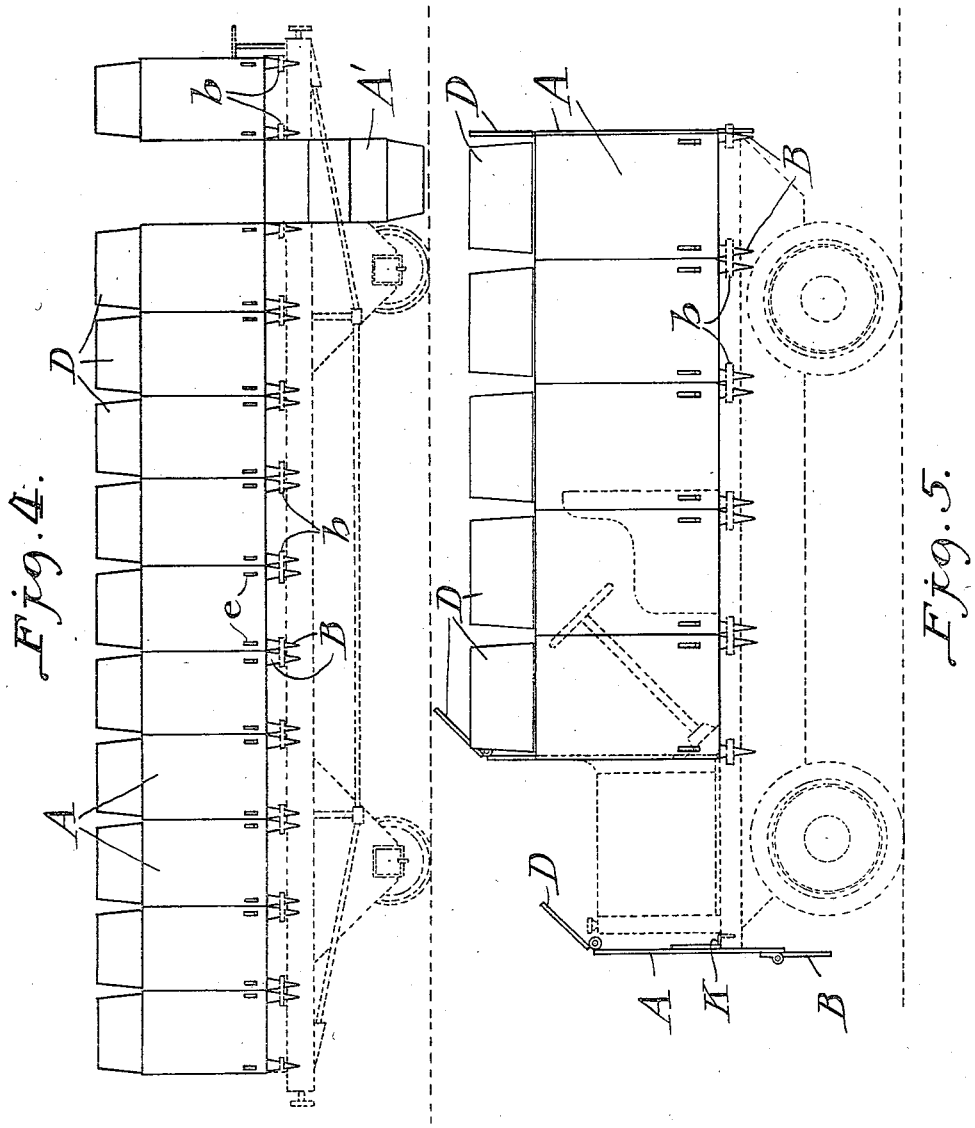

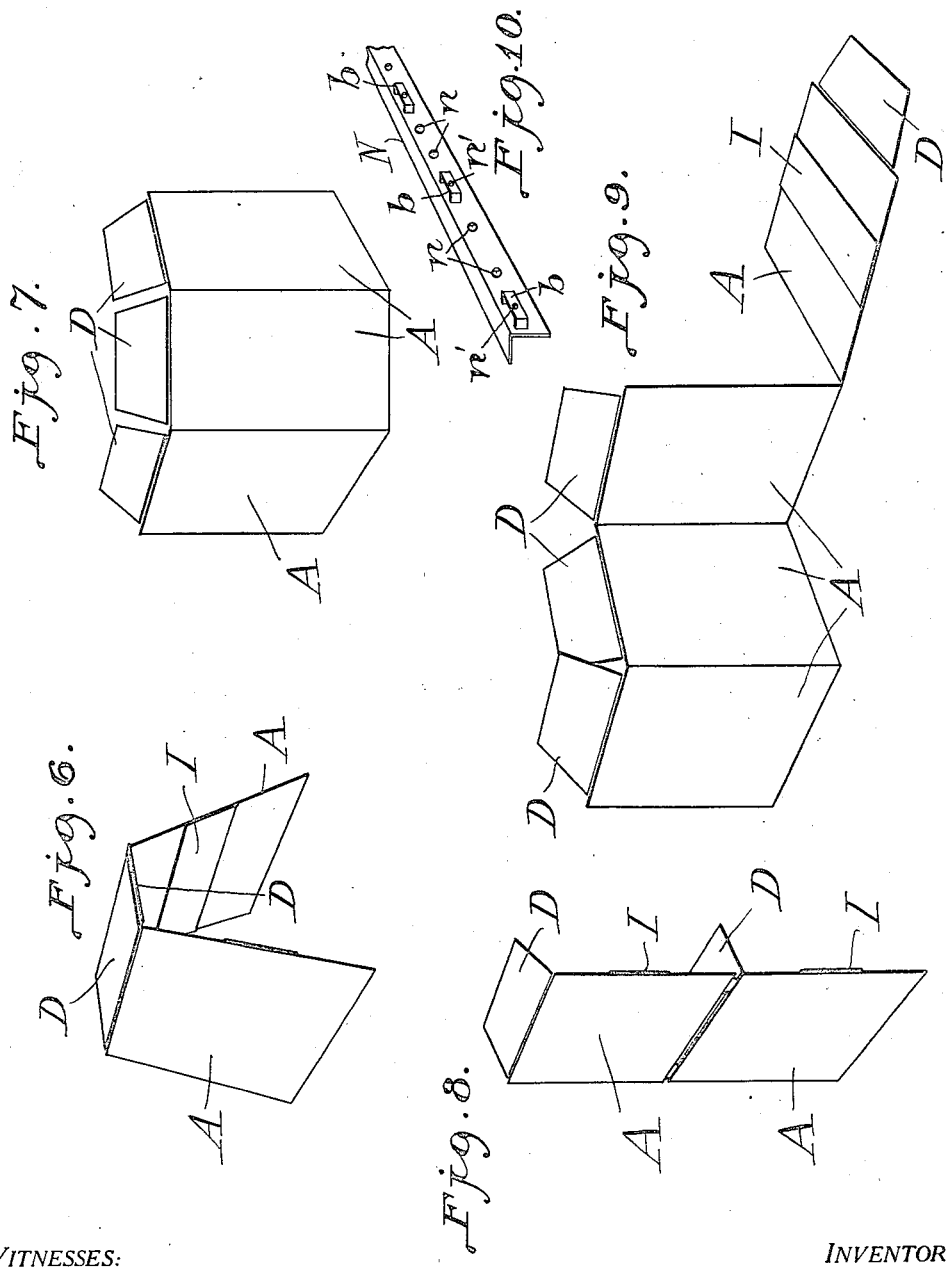

DAVID H. BELLAMORE, OF NEW YORK, N. Y., ASSIGNOR TO THE STANDARD ORDNANCE CORPORATION, OF NEW YORK, N. Y., A CORPORATION OF NEW YORK.

ARMORED VEHICLE.

1,203,962.      Specification of Letters Patent.      Patented Nov. 7, 1916.

Application filed October 24, 1914. Serial No. 868,373.

*To all whom it may concern:*

Be it known that I, DAVID H. BELLAMORE, a subject of the King of Great Britain, residing in the city of New York, borough of Manhattan, county and State of New York, have invented a certain new and useful Armored Vehicle, of which the following is a specification.

This invention is an improved armored vehicle, and the object of the invention is to protect the same and its contents during warfare.

It has been proposed heretofore to use armored vehicles to transport guns, troops, and the like, but, in every case, so far as applicant is aware, the protecting armor with which said vehicles are equipped is rigidly and undetachably secured to the vehicle, usually by rivets or the like, so that the armor, when once applied to the vehicle, cannot be removed therefrom without disrupting the attaching means, in which case the armor could not be applied to another vehicle without the use of machinery and tools.

The present invention contemplates the use of a standard unit of armor plate, which unit is of such size and proportions that it may be installed in numbers on a vehicle, and means are associated with each of said units whereby they may be readily attached to, or detached from, the vehicle at will.

Speaking generally, the invention embodies a bullet-proof member provided with means for detachably securing it to a vehicle, means also being provided for securing adjacent units together in a continuous wall of bullet-proof material.

A salient feature of the present invention resides in the fact that, while its primary purpose is the armoring of vehicles, the unit itself is readily adapted to be removed from a vehicle and serve as a protecting shield for arsenal stores, troops, etc., in the field.

In carrying out the invention in one of its practical forms, a plurality of units is provided, each of which embodies a body member composed of bullet-proof material provided at one end with a plurality of legs, preferably pivoted to the body member. The legs are preferably tapered so that they may be forced into the ground for the purpose of supporting the body member in upstanding position, or, if desired, said legs may be thrust into keepers on a vehicle to support the unit in upright position. Suitable locking means is provided for locking the body member against pivotal movement relative to the legs, when said legs are held in fixed position, and said locking means is apertured to allow of such pivotal movement when desired. The opposite or upper end of the unit has affixed thereto a pivoted apron embodying means whereby said apron may be tilted into positions in various angular relations to the body member, for purposes hereinafter described.

Features of the invention, other than those described, will be apparent from the hereinafter detailed description taken in conjunction with the annexed drawings and appended claims.

Figure 1 is a front elevation of an armor unit embodying the present invention. Fig. 2 is a back elevation thereof. Fig. 3 is an edge elevation of the unit. Figs. 4 and 5 illustrate the application of the unit as a means for protecting vehicles. Figs. 6 to 9, inclusive, illustrate, in a diagrammatic manner, some of the practical applications of the unit to field use, and Fig. 10 is a fragmental perspective view illustrating one method of providing means on a vehicle to facilitate the positioning of the armor units in fixed relation thereon.

Referring to the drawings, A designates the body member or main plate of one of the units. This plate may be of any desired size or thickness, but is preferably no heavier than actually necessary to turn rifle bullets, shrapnel shot, or the like. At the lower end of body plate A are pivoted a plurality of legs B, which legs may be locked against pivotal movement relative to body plate A by means of bolts C slidably mounted in keepers $c$, fixed on plate A and adapted to coöperate with keepers $c'$ fixed on legs B. Bolts C are provided, at their upper ends, with finger-pieces $c^2$, whereby the bolts may be readily manipulated. One end of each finger-piece $c^2$ extends through a coöperating slot $e$ in the body plate to allow of the manipulation of bolts C from the opposite side of the unit from that on which the bolts are positioned.

The upper end of body plate A, or that end opposite to which the legs are attached, is preferably provided with an apron D, also of bullet-proof material, and said apron is pivotally attached to the body plate by means of hinge members $d$ $d'$ fixed on the apron and body plate, respectively. The hinge members $d$ on the apron are preferably positioned on the same respective sides of hinge members $d'$ on the body plate, whereby the pivoted pins $d^2$, which retain said parts together, may be simultaneously withdrawn and the apron detached from the body plate by moving said apron laterally.

Apron D is adapted to be maintained in alinement with body plate A by means of a bolt F slidably mounted within the keeper $f$ fixed on the apron. When this bolt is in its locked position, as illustrated in Fig. 2, pivotal movement of the apron relative to the body plate is precluded, but, when bolt $f$ is in its unlocked position, the apron may be tilted to any angle desired. In Figs. 2 and 3, means are illustrated for retaining the apron in various angular positions relative to the body plate and, in the latter figure, several of these positions are shown in dotted lines.

Any suitable means may be utilized to retain apron D in its desired angular position, but a particularly effective means is shown for accomplishing this result. An arm G is pivoted at $g$, in the upper portion of body plate A, said arm being apertured at a plurality of points $g'$. Apron D is provided with a plurality of lugs H, in which are holes $h$ adapted to receive a pin $h'$. Arm G is adapted to be swung into coöperative relation with lugs H so that one of the apertures $g'$ is alined with one of the apertures $h$ in the lugs, whereupon the insertion of pin $h'$ through the hole in one of the lugs will cause the same to engage with aperture $g'$ in arm G, thereby locking the apron against pivotal movement. Manifestly, the angular position of apron D is controlled by the aperture in arm G and lug H, with which pin $h'$ coöperates. Since there are a plurality of lugs and a plurality of apertures, the different apertures in arm G may be brought into coöperation with any of the several lugs H, thereby giving the apron a wide range of angular positions. While I have illustrated means for tilting the apron in only one direction, it will be manifest that the apron may be mounted on the body plate with any well-known form of hinge connection, which will allow of its inclination in both directions, if desired.

When armoring a motor vehicle through the employment of a plurality of units of the type described, a plurality of these units is generally mounted side by side along the edge of the vehicle so that their continuous edges are substantially in contact. In Figs. 4 and 5, I have illustrated a method of armoring, in the former figure, a freight car such as used on railways, and, in the latter figure, an automobile truck. These illustrations are, only, exemplary of the large variety of vehicles which may be rendered safe against rifle bullets, shrapnel shot, or the like, in a simple and expeditious manner. The vehicle is provided along its sides with suitable keepers $b$, so positioned in spaced relation that the legs B of the units may be thrust thereinto and rigidly held against oscillatory movement. When the legs are held in the grip of keepers $b$, the sliding of bolts C into their locked positions will maintain the units in rigid, upright position. Preferably, at the upper corner of each unit is an apertured lug $j$, so that, when two units are placed side by side, with their edges substantially in contact, the parallel legs of a U-shaped pin 1 may be thrust into each of the adjacent apertured lugs $j$, for the purpose of locking the units rigidly together. If it is desired to form a breach in the wall thus formed, it is not necessary to entirely remove any one unit from its place, since, manifestly, the unlocking of bolts C will allow any particular unit to be folded over into the position illustrated by unit A' in Fig. 4, the slots $e$ permitting the accomplishment of this from the outside as well as the inside of the vehicle.

Since the present invention contemplates the expeditious armoring of any vehicle whatever at short notice, irrespective of its type or make, it is preferable that suitable means be provided whereby keepers B may be readily assembled in their proper positions on such vehicle as it is desired to armor. This may be accomplished in many ways, but I have shown, in Fig. 10, a short section of a strip which I may employ to accomplish this end. The strip N is angular in cross-section, the two flanges thereof being substantially at right angles. Along one of the flanges, and on the exterior thereof, are positioned keepers $b$, adapted for the reception of the legs B of the armor units. When it is desired to armor a vehicle, a section of this strip is taken, equal in length to the extent of the armor it is desired to assemble, and said strip is secured to the vehicle by suitable means such as lag screws or bolts passing through apertures $n$ in the strip. The flange of strip N, which carries keepers $b$, is stiffened and made rigid by the other flange of said strip, which strip is preferably positioned on the vehicle in such manner that the last-mentioned flange lies along the upper face of the floor or chassis frame thereof. Strips N may be easily secured to the sides of the vehicle which it is desired to protect, after which the units may be conveniently set in place. To preclude the units from being loosened by the jarring of the vehicle in passing over rough ground, suitable means is provided for locking them in place, said means being illustrated in the drawings as bolts adapted to pass through apertures n' in keepers b, and, passing through holes o in legs B, provided for this purpose, thread into the flange of strip N, see Fig. 10.

It will be manifest, from the foregoing, that any vehicle, irrespective of its type or size, may be easily, expeditiously and adequately armored in a simple manner, which can be readily carried out upon the field with the help of such tools as are invariably carried by an army. Moreover, if a vehicle, armored after the manner specified, becomes incapacitated for further duty, another machine may be brought up and the armament of the first-mentioned car quickly and easily transferred to the second.

In the armoring of a vehicle, it is found desirable, at times, to have some means for suspending the unit, and, accordingly, a plurality of hooks K are formed on the back of each unit. In Fig. 5, the unit which is utilized to protect the front of the radiator of the motor car is suspended by these hooks, which engage with the frame of the vehicle. Hooks K may be utilized in other ways; e. g., when transporting the units manually, they afford a convenient means of handling the same.

A distinctively practical advantage inherent in the type of unit hereinbefore described is that it is not only adapted for the armoring of vehicles, but, if desired, may be used by soldiers in the field, in protecting their persons, ammunition of war, etc., against the enemy's fire. Thus, a vehicle armored as aforesaid may be brought up to the very line of battle and, when arriving there, the units may be removed from the vehicle and employed by the soldiers in the field, being placed in any suitable manner to carry out the functions desired. When it is desired to stand a unit upright upon the ground, for the purpose of protecting the persons or objects behind it, this is readily accomplished by simply forcing legs B, which I preferably taper for this purpose, into the earth. So long as bolts C are in a locked position, the shield will remain in upright, rigid position.

In order that a soldier may fire from behind the unit without unduly exposing himself, I preferably provide the unit with one or more apertures J, through which the muzzle of a gun may protrude and, at the same time, these apertures are of sufficient size to allow proper use of the gun sights. Moreover, if the soldier is lying prone, he may, if he desires, utilize the slots e as firing apertures. The normal operation is, however, when in standing position, to fire over the top of the body plate, and, accordingly, the apron is made narrower than body plate A and is preferably tapered upwardly. The gun, when in the firing position, can thus be rested upon the upper edge of body plate A, thereby affording a firm support for steady aim. When the units are positioned in a row, as along the side of the vehicle in Figs. 4 and 5, the tapering aprons provide convenient firing spaces intermediate the units, without unduly exposing the gunners.

Although I do not restrict myself to the dimensions of the unit of the present invention, I preferably make the same of such size that body plate A will be substantially the height of a man, or somewhat less, so that, when the body plate is supported in upright position by legs B, body plate A serves to shield the body of a soldier from direct fire from the front, whereas apron D may be tilted at any desired angle to afford protection against falling bullets, shrapnel shot, or the like. It is essential that the unit be of minimum weight and, accordingly, all parts are made as light as is commensurate with safety. The portion of the unit which, when used as hereinbefore described, would protect the trunk of a soldier, is preferably reinforced by an additional plate I, which extends transversely of the unit, from one side to the other thereof. This reinforcing plate is of sufficient breadth to shield the most vulnerable parts of the soldier's body, so that, if a bullet, capable of penetrating the unreinforced portions of the unit, should be aimed at the vulnerable part of the soldier protected thereby, said bullet would be stopped by the increased thickness afforded by reinforcing plate I. Moreover, if apron D is folded down upon the unit, it will reinforce the upper portion thereof, so that the only unreinforced portion of said unit will be that part thereof which protects the legs of the soldier.

When the units are detached from the vehicle and used in the field, they may be assembled in many different ways, according to the uses to which they may be put. In Figs. 6 to 9, inclusive, are illustrated some of these methods of assembling. Fig. 6 illustrates the method whereby powder stores or the like may be protected from the front, top and rear, and, if one unit is not of sufficient width, the arrangement of the units shown may be repeated with a plurality of units. In this method of grouping the units, the legs are thrust into the ground, and the positioning of the aprons in proper angular relation insures rigidity and stability to the resulting formation. Fig. 7 illustrates three units grouped to afford protection to the front and flanks. The legs are thrust into the ground and the adjacent edges of the units maintained in alinement by the U- shaped locking staples 1. In Fig. 9, a plurality of units is shown arranged in zigzag formation, and it will be manifest that a long line of defense may be built up in this way. If it is desired to call a charge or for the troops to advance, without taking time to remove and carry forward the units, it is only necessary to unlock the bolts C, whereupon each unit may be folded down upon the ground, as shown to the extreme right of Fig. 9, whereupon the men may readily pass over the same in their advance. In Fig. 8, two units are illustrated as positioned one above the other. In this formation, the apron of the lower unit will serve as a support for an outlook. To allow of this arrangement, a plurality of keepers m are positioned at the upper portion of the body plate of each unit, the keepers being positioned the same distance apart as the legs and being of such size and contour as to allow of the ready introduction of said legs into said keepers.

It will be manifest, from the foregoing description, that the present invention embraces means for quickly and expeditiously armoring any desired vehicle in a simple manner, by the provision of an armor unit applicable not only to this particular and highly desirable field of use, but, also, adapted to be employed by soldiers in the field after the vehicle has been availed of in transporting troops to the desired positions. The invention fills a long-felt want, as never before, so far as applicant is aware, has an armor unit been produced which could be detachably mounted on a vehicle for the purpose of armoring the same, irrespective of its size or shape, and, besides accomplishing this result, the unit of the present invention is adapted to numerous other applications in the carrying on of warfare.

In the accompanying drawings, I have illustrated the form of unit which I preferably employ, yet, manifestly, it may be changed from time to time in adapting it to its specific environment. E. g., the apron may be made in a plurality of parts instead of one, as illustrated in dotted lines in Fig. 1. This would allow of more firing space at the upper portion of the unit, which, under certain conditions, would be advantageous. It will be understood that, if the aprons were made in a plurality of parts, each part would be operated by separate mechanism such as, e. g., that hereinbefore described for operating a single apron. Moreover, in Fig. 3 of the drawings, the apron is shown, in dotted lines, as curved. This form will at times deflect bullets to better advantage than the straight apron. Moreover, the shape of the unit may be varied and the apron omitted, if desired. Such changes as the foregoing are, manifestly, a part of the present invention, and I do, therefore, consider my invention as broadly novel, as set forth in the appended claims.

I am aware of prior Patent #419,301, granted to I. B. Abraham, pertaining to sectional gun wales for ships, and I disclaim the protecting devices therein shown as well as all similar and cognate devices.

Having thus fully described the invention, what I claim as new, and desire to secure by Letters Patent, is:—

1. In a structure of the class described, a land vehicle, in combination with a plurality of manually portable, bullet-proof units of substantially the same size, arranged side by side along the side of the vehicle, separate means, coöperating with the units separately, for individually and detachably mounting each of said units on the vehicle independently of the others, whereby any one, or a plurality, of said units may be detached from the vehicle, for use in the field as a bullet-proof shield, without interfering with the remaining units.

2. In a structure of the class described, a land vehicle, in combination with a plurality of manually portable, bullet-proof units, and means, mounted upon each of said units, for separately and detachably mounting them side by side upon the vehicle, said means being also adapted to support the units in upright position, when the same are removed from the vehicle for use in the field as bullet-proof shields.

3. In a structure of the class described, a land vehicle, in combination with a plurality of manually portable, bullet-proof units arranged side by side along the opposite edges of the vehicle, and supporting means mounted on each of said units and coöperating with the vehicle for individually securing each of the units to the vehicle in normally upright position, said means being independent of the means for maintaining the adjacent units in upright position.

4. In a structure of the class described, a land vehicle, in combination with a plurality of manually portable, bullet-proof units arranged side by side along the opposite edges of the vehicle, and supporting means mounted on each of said units and coöperating with the vehicle for individually and detachably securing each of the units to the vehicle in normally upright position, said means being independent of the means for maintaining the adjacent units in upright position, and said securing means being capable of supporting the units in upright position when the same are removed from the vehicle and used in the field as bullet-proof shields.

5. In a structure of the class described, a land vehicle, in combination with a plurality of manually portable, bullet-proof units arranged side by side along the opposite edges of the vehicle, supporting means mounted on each of said units and coöperating with the vehicle for individually securing each of the units to the vehicle in normally upright position, said means being independent of the means for maintaining the adjacent units in upright position, and means, independent of the supporting means, for preserving substantial alinement of the units.

6. In a structure of the class described, a land vehicle, in combination with a plurality of manually portable, bullet-proof units arranged side by side along the opposite edges of the vehicle, supporting means mounted on each of said units and coöperating with the vehicle for individually and detachably securing each of the units to the vehicle in normally upright position, said means being independent of the means for maintaining the adjacent units in upright position, and said securing means being of such character as to support the units in upright position when the same are removed from the vehicle and used in the field as bullet-proof shields, and means, independent of the supporting means, for securing together the abutting edges of adjacent units whereby contiguity of the wall formed by a plurality of the units is assured, either when assembled on the vehicle or in the field.

7. In a structure of the class described, a land vehicle, in combination with a plurality of bullet-proof units, each comprising a body member, supporting means pivotally secured near the lower edge thereof, said supporting means being adapted to coöperate with the vehicle to mount the unit for pivotal movement thereon, and means mounted wholly on the units and coöperating with the pivotal attachment between the supporting means and the body member for locking the latter against pivotal movement, whereby the body member is maintained in upstanding position.

8. In a structure of the class described, a land vehicle, in combination with a plurality of bullet-proof units, each comprising a body member, supporting means pivotally secured near the lower edge thereof, said supporting means being adapted to coöperate with the vehicle to mount the unit for pivotal movement thereon, and means coöperating with the pivotal attachment between the supporting means and the body member for locking the latter against pivotal movement, whereby the body member is maintained in upstanding position, said supporting means being adapted, when removed from the vehicle, to support the body member in upstanding position, when the locking means is operated to preclude pivotal movement between the parts.

9. In an armored land vehicle a plurality of bullet-proof units, each embodying a body member, a pivoted apron fixed to the top thereof and adapted to be tilted to any desired angular position relative to the body member, means for retaining said apron in any of its tilted positions, and means for individually and detachably mounting the units on the vehicle.

10. In an armored land vehicle, a plurality of manually portable bullet-proof units, each comprising a body member, a pivoted apron fixed to the top thereof and adapted to be tilted to any desired angular position relative to the body member, means for retaining said apron in any of its tilted positions, and legs extending from the opposite end of said member for detachably supporting the units individually upon the vehicle.

11. In an armored land vehicle, a plurality of bullet-proof units, each comprising a body member, a pivoted apron fixed to the top thereof and adapted to be tilted to any desired angular position relative to the body member, legs pivotally attached to the opposite end of said member for detachably supporting the units individually upon the vehicle, and means for locking said legs against pivotal movement.

12. In an armored land vehicle, a plurality of bullet-proof units, each comprising a body member, a pivoted apron fixed to the top thereof and adapted to be tilted to any desired angular position relative to the body member, legs pivotally attached to the opposite end of said member for detachably supporting the units individually upon the vehicle, and means operable from either side of the body member for locking said legs against pivotal movement.

13. In an armored land vehicle, a plurality of manually portable bullet-proof units, each of which embodies a body member, a reinforcing plate positioned intermediate the ends thereof for doubly rendering a portion of said plate impenetrable by bullets, an apron pivoted to one end of the body member, said apron being foldable upon the body member to coöperate with the reinforcing plate in reinforcing that portion of the body member intermediate said plate and the apron supporting end of the body member and means for individually detachably mounting said units on the vehicle.

14. In an armored land vehicle, a plurality of manually portable bullet-proof units, each embodying a body member, an apron pivotally secured at the top thereof, and adapted to be tilted into angular relation to the body member, said apron tapering from its base upwardly, means for maintaining said apron in any of its tilted positions and means for individually and detachably mounting said units on the vehicle.

15. In a structure of the class described, a land vehicle, in combination with a plurality of bullet-proof units, each embodying a body member, supporting means pivotally attached to one edge of said body member for individually mounting the units on the vehicle, and means, operable from either face of said body member, for locking the body member against pivotal movement on the supporting means.

16. In an armored land vehicle, a plurality of manually portable bullet-proof units, each of which embodies a body member, each of said body members having an apron secured at the upper edge thereof, said aprons being adapted to be tilted to any desired angular position relative to their respective body members, means for maintaining said aprons in any of their tilted positions, and legs extending from the opposite end of each of said body members and adapted to engage supporting devices positioned on the vehicle for the purpose of detachably supporting said units thereon, whereby said units form an armament for said vehicle.

17. In an armored land vehicle, a plurality of manually portable bullet-proof units, each of which is provided with a body member having an apron secured to the upper end thereof, which apron is adapted to be tilted to any desired angular position relative to its respective body member, means for maintaining said apron in any of its tilted positions, legs extending from the opposite end of each of said body members and adapted to engage the supporting devices positioned on the vehicle whereby said units are individually detachably mounted on the vehicle to form an armament therefor, and means for locking said legs against inadvertent displacement from the supporting devices on the vehicle.

18. In a structure of the class described, a land vehicle, in combination with a plurality of manually portable, rigid, bullet-proof units arranged side by side along the edge of the vehicle, each of which units is provided with tapering legs, and retaining devices positioned on the vehicle for the reception of the legs of said units, whereby said units are detachably mounted on the vehicle in substantial alinement, said units being individually removable from the vehicle for use in the field, in which use the legs serve to maintain the units in upstanding position.

19. In a structure of the class described, a land vehicle, in combination with a plurality of manually portable, bullet-proof units, each embodying a rigid, unitary body member, a rigid, unitary apron pivotally secured to the upper end of each body member, said aprons tapering from their bases upwardly, whereby, when the body members are positioned with their edges in adjoining relation, firing spaces are provided between the contiguous aprons, and means for individually, detachably mounting said units on the vehicle.

20. In a structure of the class described, a land vehicle, in combination with a plurality of manually portable, bullet-proof units positioned side by side along the opposite edges of the vehicle, means mounted on each unit for separately and individually maintaining the same in upstanding position, such securing means being positioned on the lower portions of the respective units so as to leave the upper portions thereof unencumbered thereby.

In testimony whereof I have signed my name to this specification in the presence of two subscribing witnesses.

DAVID H. BELLAMORE.

Witnesses:
CORNELIUS ZABRISKIE,
F. S. FITZSIMONS.